United States Patent
Kane (10) Patent No.: US 9,621,101 B2
(45) Date of Patent: Apr. 11, 2017

(54) ELECTROMAGNETIC COMPATIBILITY FILTER

(71) Applicant: JOHNSON CONTROLS TECHNOLOGY COMPANY, Holland, MI (US)

(72) Inventor: Ajit W. Kane, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/962,394

(22) Filed: Dec. 8, 2015

(65) Prior Publication Data

US 2016/0164448 A1 Jun. 9, 2016

Related U.S. Application Data (60) Provisional application No. 62/089,602, filed on Dec. 9, 2014.

(51) Int. Cl.
*H03K 5/00* (2006.01)
*H02P 27/06* (2006.01)
(Continued)

(52) U.S. Cl.
CPC ............ *H02P 27/06* (2013.01); *H02M 1/126* (2013.01); *H02M 1/44* (2013.01); *H02M 5/44* (2013.01);
(Continued)

(58) Field of Classification Search
CPC ............ F25B 49/025; F25B 2600/0253; F25B 2600/021; F25B 2600/024; H02M 1/12;
(Continued)

(56) References Cited

U.S. PATENT DOCUMENTS

| 7,746,020 | B2 | 6/2010 | Schnetzka | |
|---|---|---|---|---|
| 2005/0189888 | A1* | 9/2005 | Federman | F25B 49/025 318/67 |
| 2008/0174255 | A1 | 7/2008 | Schnetzka et al. | |

FOREIGN PATENT DOCUMENTS

| EP | 2 148 437 A1 | 1/2010 |
|---|---|---|
| WO | 2012/025660 A1 | 3/2012 |

OTHER PUBLICATIONS

Hedayati et al., "Common-Mode Filter Design for PWM Rectifier-Based Motor Drive", IEEE Trans. on Power Electronics Engineers., Nov. 11, 2013, vol. 28, No. 11, pp. 5364-5371.
(Continued)

*Primary Examiner* — Karen Masih
(74) *Attorney, Agent, or Firm* — Fletcher Yoder, P.C.

(57) ABSTRACT

The variable speed drive system is arranged to receive input power at fixed input voltage magnitude and frequency and provide power at a variable voltage and variable frequency. The variable speed drive includes a converter connected to an AC source to convert the input voltage to a boosted DC voltage. A DC link connected to the converter filters the DC voltage from the converter stage. An inverter converts the DC link voltage into variable voltage and the variable frequency AC power. An electromagnetic compatibility (EMC) filter includes a series RC circuit from phase-to-ground circuit for each input phase of the converter. The RC circuit includes a resistor connected in series with a capacitor between the converter phase and ground. The EMC filter is connected to the line side of the converter. An inductor is connected between the input source and the EMC filter.

11 Claims, 8 Drawing Sheets

(51) Int. Cl.
    *H02M 1/44*       (2007.01)
    *H02M 1/12*       (2006.01)
    *H02M 5/44*       (2006.01)
    *H02M 5/458*      (2006.01)
(52) U.S. Cl.
    CPC .... *H02M 5/4585* (2013.01); *H02M 2001/123* (2013.01)
(58) Field of Classification Search
    CPC ...... H02P 27/06; H02P 2201/03; H02P 23/04; H02J 3/01
    See application file for complete search history.

(56) References Cited

OTHER PUBLICATIONS

TW 104141128 Search Report dated Oct. 4, 2016.

* cited by examiner

ELECTROMAGNETIC COMPATIBILITY FILTER

BACKGROUND

The application generally relates to an electromagnetic compatibility (EMC) filter. The application relates more specifically to an electromagnetic compatibility filter for use in variable speed drives (VSD).

A variable speed drive (VSD) for heating, ventilation, air-conditioning and refrigeration (HVAC&R) applications typically includes a rectifier or converter, a DC link, and an inverter. VSDs that incorporate active converter technology to provide power factor correction and reduced input current harmonics also generate a significantly higher level of common mode RMS and peak to peak voltage to the motor stator windings as compared to conventional VSDs.

The VSD generates a common mode noise with respect to ground that can cause interference with radio equipment and transmissions. To reduce or eliminate noise generated by the VSD it is necessary to suppress the common mode noise by giving it a circulating path within the VSD. This filter creates a small loop area for the common mode noise there by reducing the interference.

Typically EMC filters are used in conjunction with VSDs to reduce the transfer of electromagnetic noise between the VSD and mains power supply. The EMC filter comprises a large inductor which is connected in series with the VSD input. Such EMC filters reduce the overall efficiency of the VSD due to magnetic losses, and further increase the cost and size of the VSD.

Other features and advantages will be made apparent from the present specification. The teachings disclosed extend to those embodiments that fall within the scope of the claims, regardless of whether they accomplish one or more of the aforementioned needs.

SUMMARY

One embodiment relates to a new conducted electromagnetic emissions filter for variable speed drives. This filter may be employed on passive front end VSDs or active front end VSDs. The variable speed drive system is arranged to receive an input AC power at a fixed AC input voltage magnitude and frequency and provide an output AC power at a variable voltage and variable frequency, the variable speed drive including: a converter stage connected to an AC power source providing the input AC voltage, the converter stage being configured to convert the input AC voltage to a boosted DC voltage; a DC link connected to the converter stage, the DC link being configured to filter and store the boosted DC voltage from the converter stage; an inverter stage connected to the DC link, the inverter stage being configured to convert the boosted DC voltage from the DC link into the output AC power having the variable voltage and the variable frequency; and an electromagnetic compatibility (EMC) filter; the EMC filter comprising a series RC circuit from phase-to-ground circuit for each input phase of converter section each RC circuit including a resistor connected in series with a capacitor between each phase of converter section and ground; the EMC filter connected to the converter on a line side of the converter; and a line-side inductor connected between the input AC source and the EMC filter.

Another embodiment relates to an EMC filter for a VSD. The EMC filter includes a series RC circuit from phase-to-ground circuit for each input phase of a converter section, each series RC circuit including a resistor connected in series with a capacitor between each phase of converter section and ground. The EMC filter is connected to the converter on a line side of the converter; and a line-side inductor connected between the input AC source and the EMC filter.

Typically EMC filters form a bulky inductor which must be connected in series with the VSD input, thereby increasing cost and size of the VSD. The disclosed filter is connected between the power electronics device input and ground. This creates a very small loop area for the generated noise. The filter also utilizes the circuit parasitic and existing filter inductor to make the filter. It allows the filter to be small and very low cost.

One advantage is to reduce the common mode and differential mode currents associated with conducted electromagnetic interference and radio frequency interference present at the AC power source as a result of the operation of the VSD.

Alternative exemplary embodiments relate to other features and combinations of features as may be generally recited in the claims.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1A:
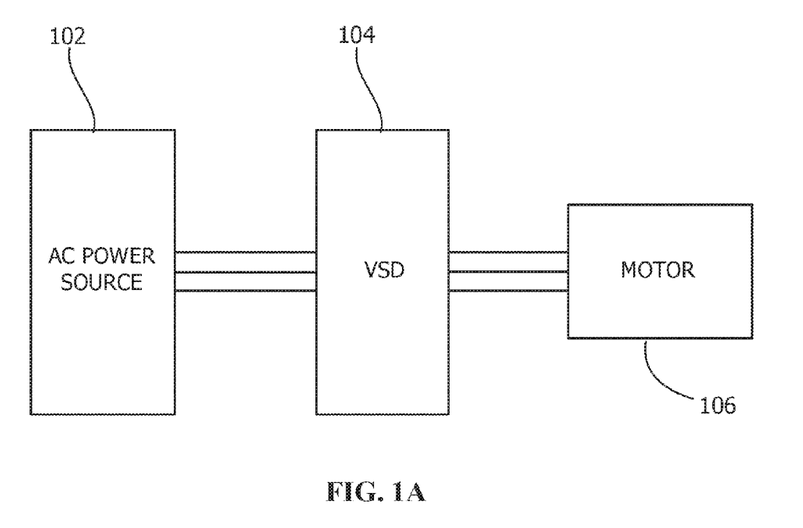
FIGS. 1A and 1B illustrate exemplary system configurations.
Figure 1B:
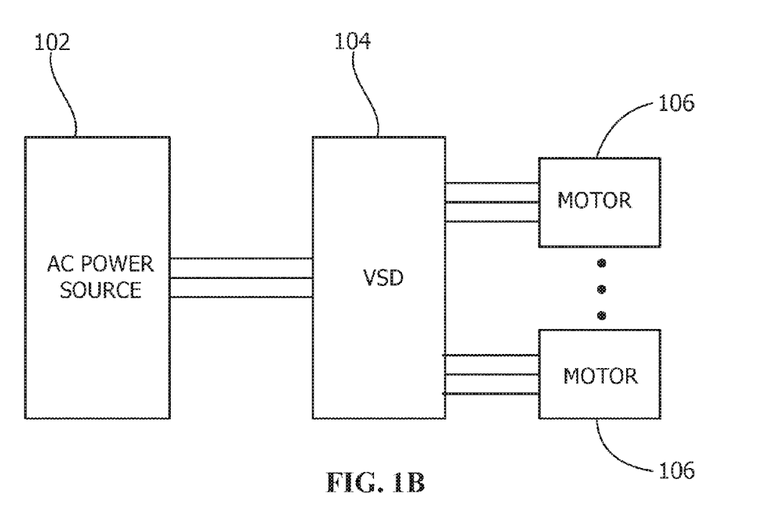

FIGS. 1A and 1B illustrate generally system configurations. An AC power source 102 supplies a variable speed drive (VSD) 104, which powers a motor 106 (see FIG. 1A) or motors 106 (see FIG. 1B). The motor(s) 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380

V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to the motor(s) 106 at a desired voltage and desired frequency, both of which can be varied to satisfy particular requirements. Preferably, the VSD 104 can provide AC power to the motor(s) 106 having higher voltages and frequencies and lower voltages and frequencies than the rated voltage and frequency of the motor(s) 106. In another embodiment, the VSD 104 may again provide higher and lower frequencies but only the same or lower voltages than the rated voltage and frequency of the motor(s) 106. The motor(s) 106 is preferably an induction motor, but can include any type of motor that is capable of being operated at variable speeds. The induction motor can have any suitable pole arrangement including two poles, four poles or six poles.

Figure 2A:
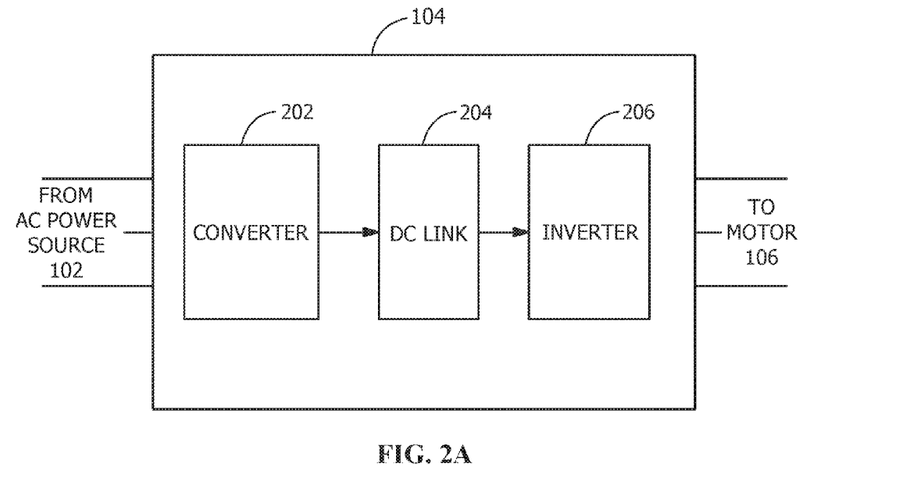
FIGS. 2A and 2B illustrate different embodiments of a VSD.
Figure 2B:
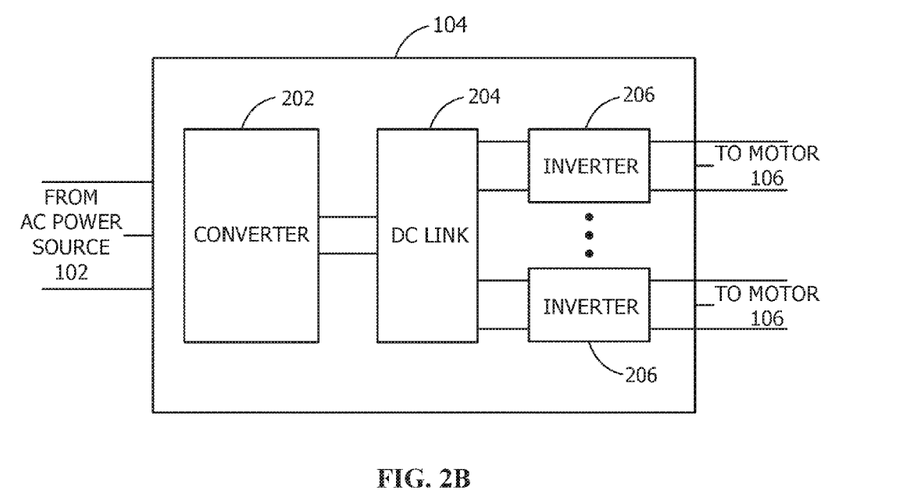

FIGS. 2A and 2B illustrate different embodiments of the VSD 104. The VSD 104 can have three stages: a converter stage 202, a DC link stage 204 and an output stage having one inverter 206 (see FIG. 2A) or a plurality of inverters 206 (see FIG. 2B). The converter 202 converts the fixed line frequency, fixed line voltage AC power from the AC power source 102 into DC power. The DC link 204 filters the DC power from the converter 202 and provides energy storage components. The DC link 204 can be composed of capacitors, inductors, or a combination thereof, which are passive devices that exhibit high reliability rates and very low failure rates. Finally, in the embodiment of FIG. 2A, the inverter 206 converts the DC power from the DC link 204 into variable frequency, variable voltage AC power for the motor 106 and, in the embodiment of FIG. 2B, the inverters 206 are connected in parallel on the DC link 204 and each inverter 206 converts the DC power from the DC link 204 into a variable frequency, variable voltage AC power for a corresponding motor 106. The inverter(s) 206 can be a power module that can include power transistors, insulated gate bipolar transistor (IGBT) power switches and inverse diodes interconnected with wire bond technology. Furthermore, it is to be understood that the DC link 204 and the inverter(s) 206 of the VSD 104 can incorporate different components from those discussed above so long as the DC link 204 and inverter(s) 206 of the VSD 104 can provide the motors 106 with appropriate output voltages and frequencies.

With regard to FIGS. 1B and 2B, the inverters 206 are jointly controlled by a control system such that each inverter 206 provides AC power at the same desired voltage and frequency to corresponding motors based on a common control signal or control instruction provided to each of the inverters 206. In another embodiment, the inverters 206 are individually controlled by a control system to permit each inverter 206 to provide AC power at different desired voltages and frequencies to corresponding motors 106 based on separate control signals or control instructions provided to each inverter 206. This capability permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by a control panel or other suitable control device.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In one embodiment, there can be either 2 or 3 inverters 206 incorporated in the VSD 104 that are connected in parallel to the DC link 204 and used for powering a corresponding motor 106. While the VSD 104 can have between 2 and 3 inverters 206, it is to be understood that more than 3 inverters 206 can be used so long as the DC link 204 can provide and maintain the appropriate DC voltage to each of the inverters 206.

Figure 3:
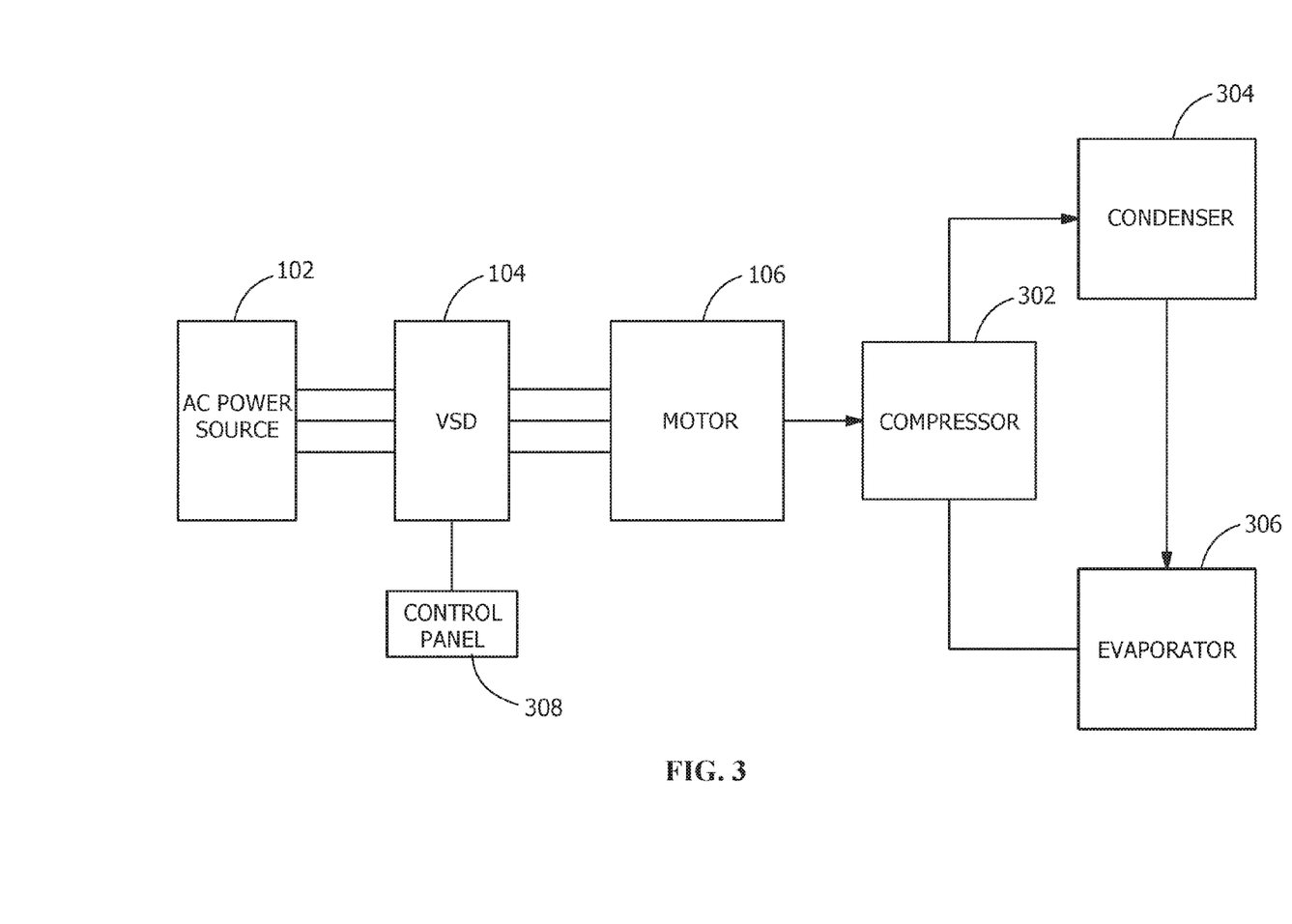
FIG. 3 illustrates generally one embodiment of a refrigeration or chiller system using the system configuration and VSD of FIGS. 1A and 2A.

FIG. 3 illustrates generally one embodiment of a refrigeration or chiller system using the system configuration and VSD 104 of FIGS. 1A and 2A. As shown in FIG. 3, the HVAC, refrigeration or liquid chiller system 300 includes a compressor 302, a condenser arrangement 304, a liquid chiller or evaporator arrangement 306 and the control panel 308. The compressor 302 is driven by motor 106 that is powered by VSD 104. The VSD 104 receives AC power having a particular fixed line voltage and fixed line frequency from AC power source 102 and provides AC power to the motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, and the motor 106.

Compressor 302 compresses a refrigerant vapor and delivers the vapor to the condenser 304 through a discharge line. The compressor 302 can be any suitable type of compressor, e.g., screw compressor, centrifugal compressor, reciprocating compressor, scroll compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to the evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD as shown in FIGS. 1B and 2B or multiple VSDs, see generally, the embodiment shown in FIGS. 1A and 2A, connected into each of one or more refrigerant circuits.

Figure 4:
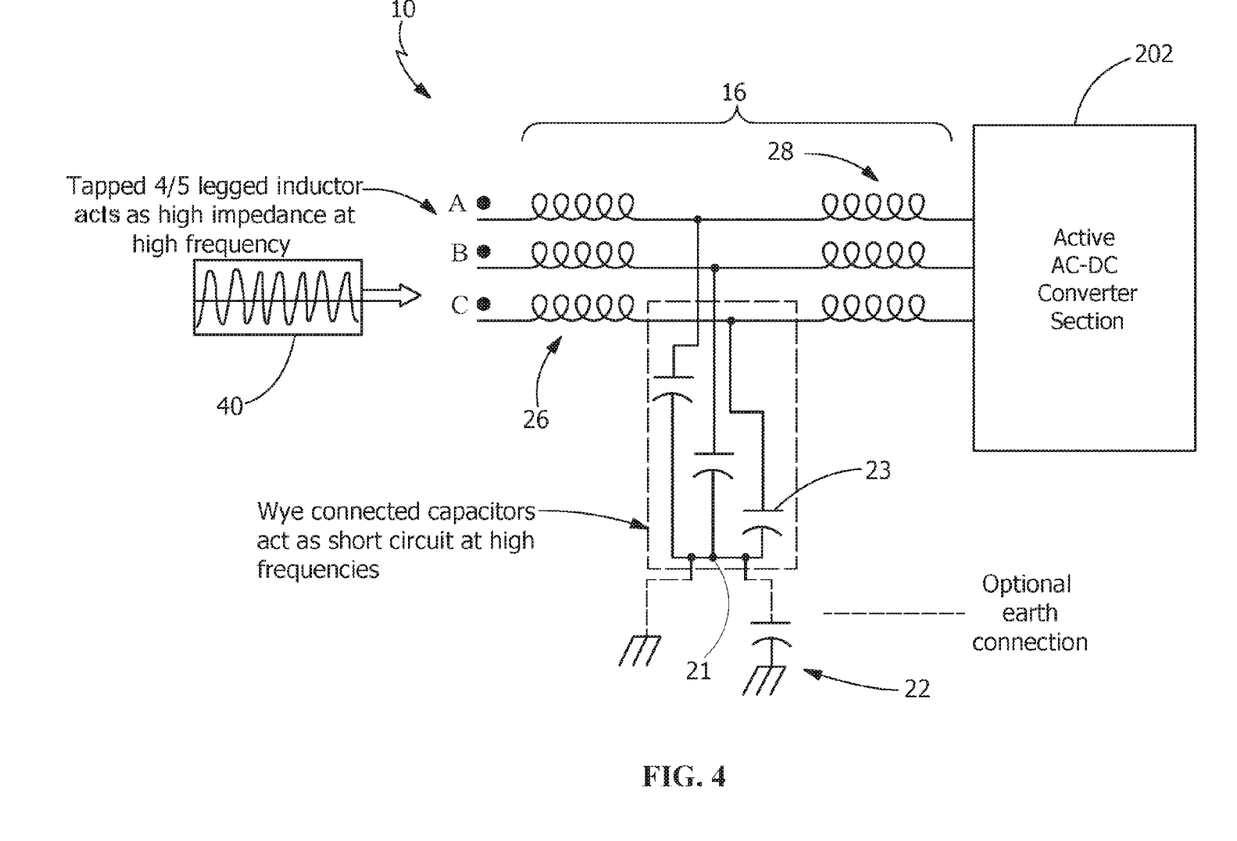
FIG. 4 is a schematic diagram of elements of an input filter.

Referring next to FIG. 4, there is a schematic diagram of elements of an input filter 10 shown. EMI/RFI sources generated by the Active Converter 202 are filtered ahead of the converter 202 by splitting a three-phase AC input inductor 16 into a line-side inductor 26 and load-side inductor 28 per phase. The line-side inductors 26 and load-side inductors 28 are connected by inductor tap portions 18. A capacitive three-phase filter element 20 is wye-connected between the inductor tap portions 18. An optional earth connection 22 may be connected to a common point 21 of the wye-connected filter element 20. The earth connection 22 may alternately include a grounding capacitor 23. The line- and load-side inductors 26 and 28, respectively, and the capacitive filter element 20 are designed with inductance and capacitance values to provide a roll off of the EMI/RFI sources—i.e., high frequency switching components of the input current conducted by the converter 202. The input filter provides a high impedance via the differential mode inductive components of inductances 26 and 28 and a low impedance via the three-phase wye connected capacitance 20 to the EMI/RFI sources, while passing the fundamental component of the power current, e.g., 60 Hz, through the network with minimal impedance. By utilizing a four- or five-legged (4/5) input inductor 16, a common mode inductive component is formed via inductances 26 and 28 and together with the optional earth connection 22 or the grounding capacitor 23, increases to the capacity of the filter 10 acts to prevent common mode current generated by the converter 202 from flowing into the mains power source 102. The wye-connection point 21 of the input filter 10 may be directly earthed or alternately earthed through a separate capacitor 23 to provide greater shunting of high-frequency currents to earth. In one embodiment, the inductor 16 may be provided with low inter-winding capacitance.

Line-side inductors 26 provide impedance at a predetermined switching frequency of the VSD 104 between the wye-connected capacitors 20 and the AC power source 102. The impedance of the line-side inductors 26 is designed to allow the wye-connected capacitors 20 to be more effective than a system with no significant impedance between the input AC mains 102 and the VSD 104. Inductors 26 also provide high-frequency impedance in the reverse direction, to restrict the flow of high-frequency current from the converter 202 to the AC power source 102. Thus the inductors 26 restrict or limit high frequency emissions from reflecting back to the AC power source 102.

Inductors 28 provide impedance between the capacitors 20 and the input to the VSD 104. Inductors 28 provide high impedance between the AC power source 102 and the active converter 202 portion of the VSD 104. Alternately, if the VSD 104 is a conventional VSD with a passive rectifier converter, the impedance of inductor 28 isolates the VSD 104 from the input AC mains 102 and reduces high frequency emissions conducted to the mains 102 from the VSD 104.

The wye-connected capacitor bank 20 provides low impedance between phase conductors A, B & C for at least one switching frequency of the VSD 104, and provides low impedance for differential mode current flow. The wye-connected capacitor bank 20 also provides a low impedance path for flow of at least one switching frequency to an earth ground connection 22, assuming that an earth ground connection is provided, for reducing common mode current flow.

Figure 5:
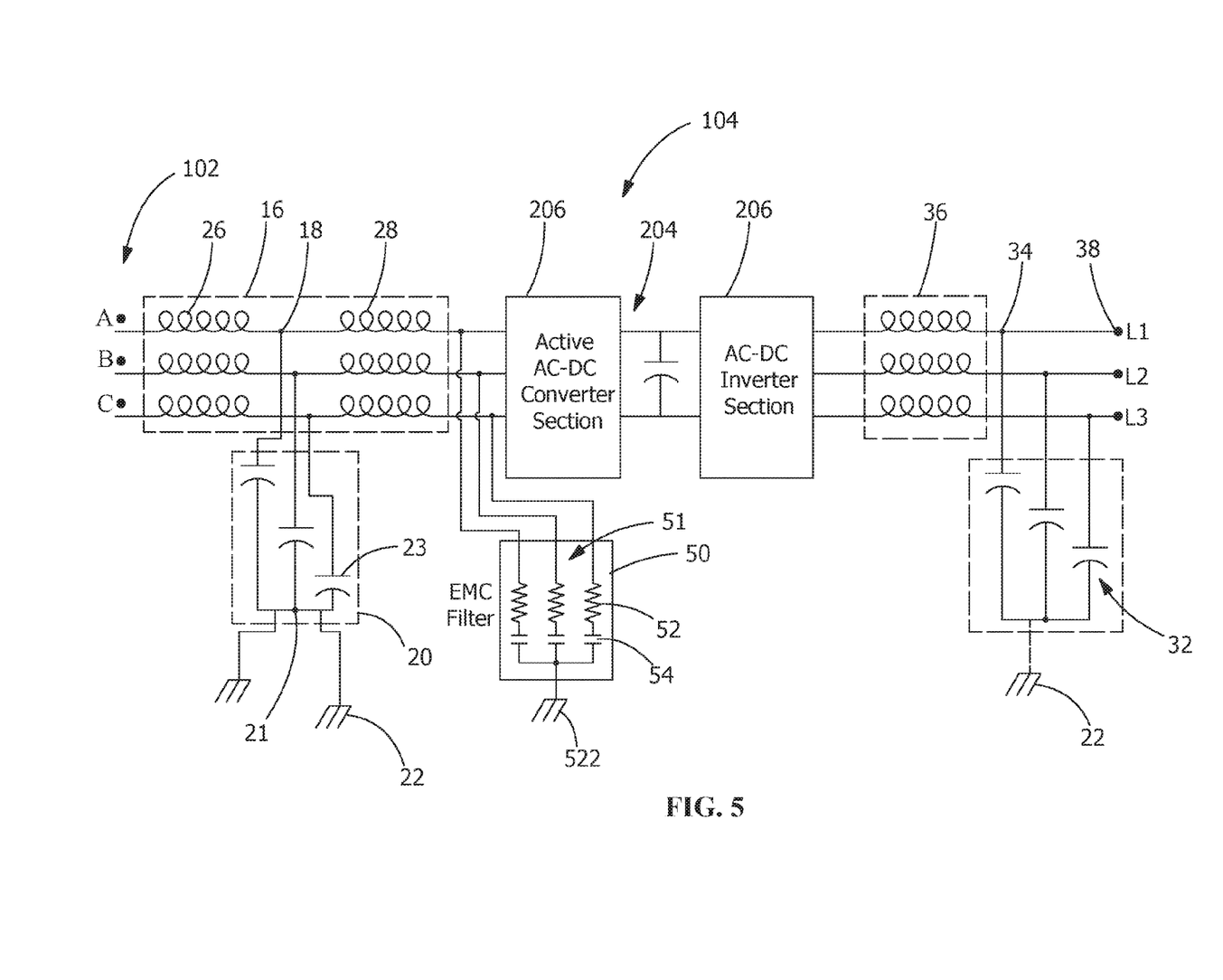
FIG. 5 an embodiment of a variable speed drive having an output filter with an EMC filter and a common mode/differential mode input filter circuit.

Referring next to FIG. 5, an embodiment of a variable speed drive having an output filter with an EMC filter and optionally, a common mode/differential mode input filter circuit is illustrated. The EMI/RFI input filter as described with respect to FIG. 4, above, is connected at the input of the converter 202, and performs the same filtering functions as described above. The addition of the input filter with an inductor 16 at the input to the VSD 104 effectively provides a high-impedance circuit between the AC power mains 102 and the VSD 104. To provide a low impedance path for common mode current flow, a three-phase wye connected capacitor bank 30 including three common mode capacitors 32 are connected between the VSD's motor connection terminal 38, and earth ground 22. The capacitor bank 30 is equivalent to a short circuit—i.e., low impedance—at high frequency, effectively earthing the destructive high frequency AC components present on the three VSD output terminals 34 and shunting the destructive AC components from reaching the motor or other type of load connected to the VSD, thus filtering out currents resulting from common mode voltages. The capacitor bank 30 allows high-frequency AC components to bypass the parasitic capacitive earthing elements of the motor and eliminates bearing damage caused by common mode voltages and currents.

The EMC filter 50 includes a series RC circuit from phase-to-ground circuit for each input phase A, B and C of active converter section 202. In one embodiment, EMC filter 50 includes three RC filters 51 that includes a resistor 52 connected in series with a capacitor 54, between each phase A, B and C, and ground 22.

Figure 6:
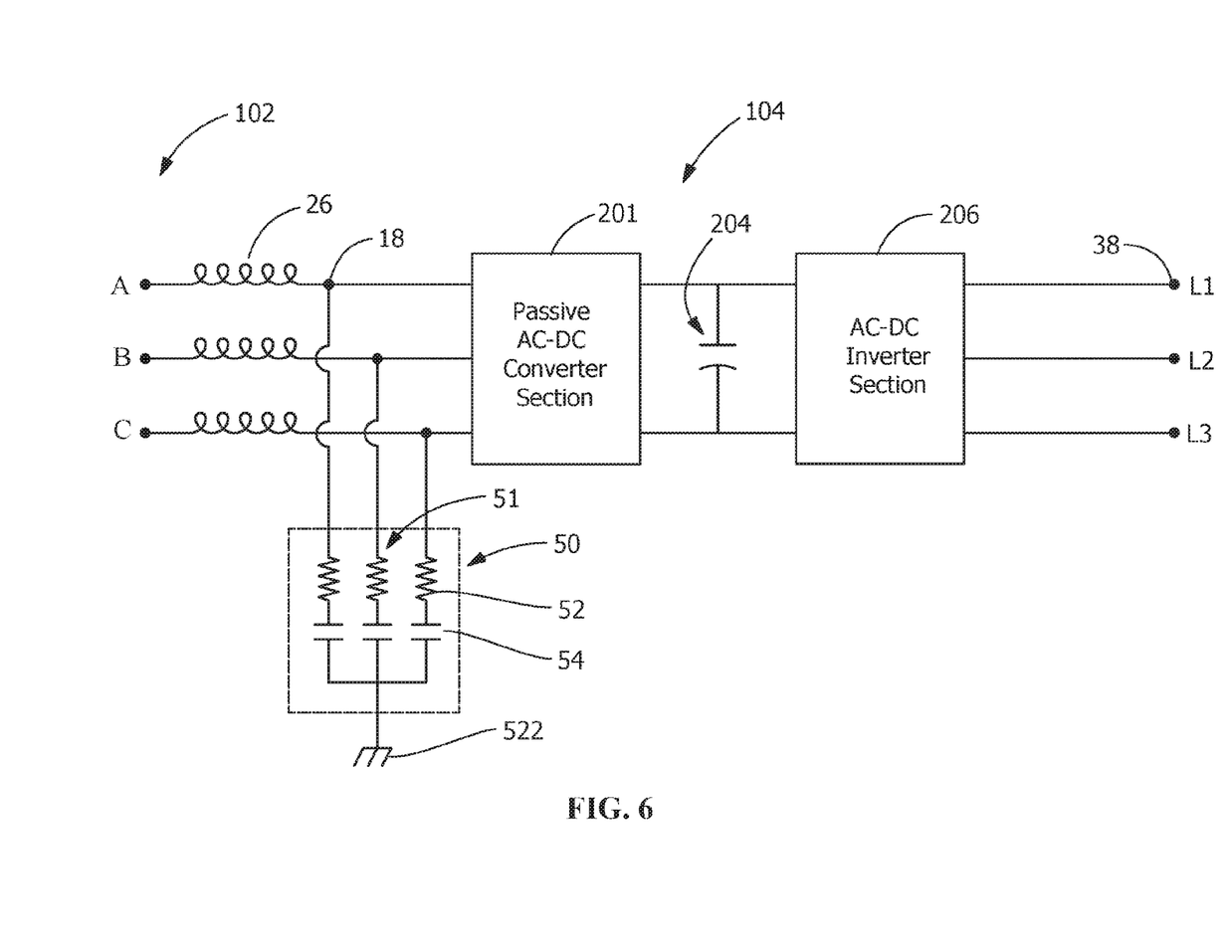
FIG. 6 is an exemplary embodiment a VSD that includes a passive converter.

Referring next to FIG. 6, in another exemplary embodiment a VSD 104 includes a passive converter 201, in place of the active converter shown in FIG. 5. As described above with respect to FIG. 5, converter 201 converts the line voltage AC power from the AC power source 102 into DC power. The DC link 204 filters the DC power from the converter 202 and provides energy storage components. The inverter 206 converts the DC power from the DC link 204 into variable frequency, variable voltage AC power. In an embodiment, resistor 52 may have a resistance value that connected in series with a capacitor 54 reduces the gain at the frequency at which a VSD may generate a parallel resonance causing peak noise transfer. RC filters may have different values for resistor 52 and capacitor 54, to adjust for variance in the peak noise frequencies, which may be in the range of 150 kHz to 30000 kHz.

The EMC filter 50 includes a series RC circuit from phase-to-ground circuit for each input phase A, B and C of passive converter section 201. In one embodiment, EMC filter 50 includes three RC filters 51 that includes a resistor 52 connected in series with a capacitor 54, between each phase A, B and C, and ground 22. EMC filter is connected to passive converter 201 on the line side of converter 201 at taps 18. Lne-side inductors 26 are connected between the input AC source 102 and EMC filter 50.

Figure 7:
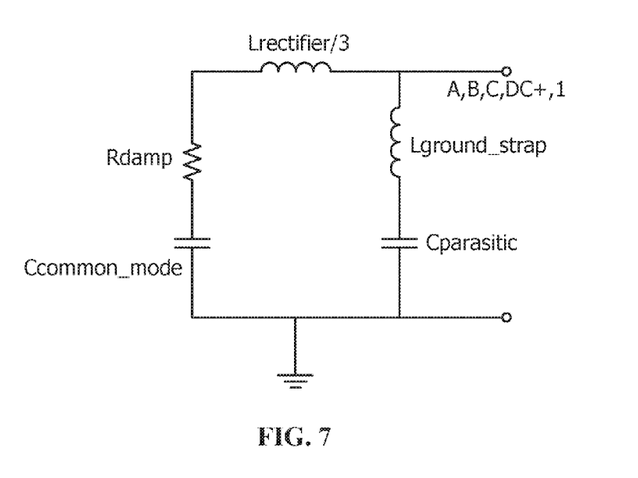
FIG. 7 is a common mode equivalent circuit including an EMC filter.
Figure 8:
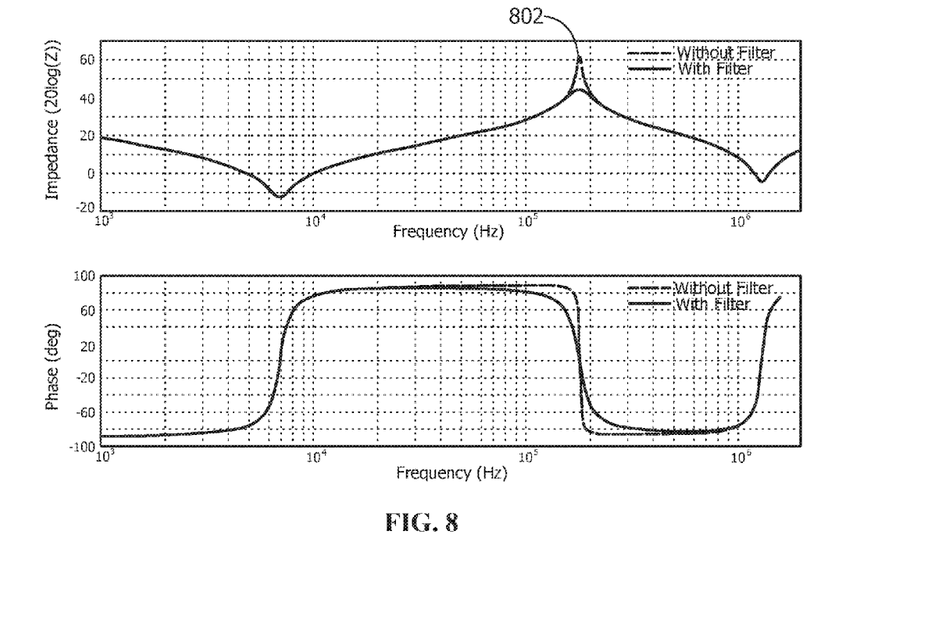
FIG. 8 is a graph showing the common mode impedance of the VSD with and without EMC filter.
Figure 9:
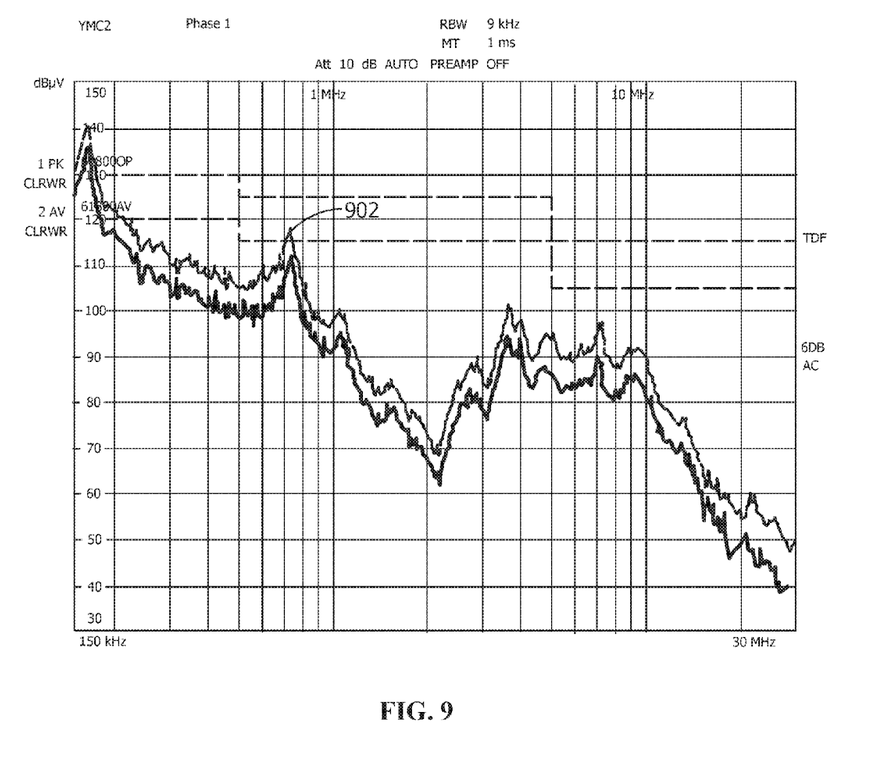
FIG. 9 shows a graph of the voltage response of the VSD with an EMC filter installed in the VSD.

Referring to FIG. 7, a common mode equivalent circuit including an EMC filter 50 is shown. Lrectifier/3 is the rectifier side inductance of VSD 104, Ccommon_mode is the common mode capacitance of the VSD, Rdamp is the damping resistance of the input filter, Cparasitic is the parasitic capacitance to ground from the DC link 204 and the converter 202/inverter 206 AC terminals, and Lground_strap is the parasitic inductance of the ground connection 22. $R_f$ is the resistor 52 and $C_f$ is capacitor 54. Resistor 52 minimizes peak current through capacitor 54 and active converter section 202, and capacitor 54 reduces power loss in resistor 52 at close to fundamental input frequency, e.g., 50/60 kHz. The value of resistor 52 may be selected such that a sufficient reduction of the gain is obtained at parallel resonance frequency. The converter generated noise is attenuated as can be seen at peaks 802 and 902 in FIGS. 8 and 9, respectively.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The invention claimed is:

1. A variable speed drive system configured to receive as an input AC power at a fixed AC input voltage magnitude and frequency and provide an output AC power at a variable voltage and a variable frequency, the variable speed drive comprising:
   a converter adapted to be coupled to an AC power source providing the input AC voltage, the converter being configured to convert the input AC voltage to a DC voltage;
   a DC link connected to the converter, the DC link being configured to filter the DC voltage and to store energy from the converter;
   an inverter connected to the DC link, the inverter being configured to convert the DC voltage from the DC link into the output AC power having the variable voltage and the variable frequency;
   an input filter comprising a three phase inductor having three windings, each winding having a first end adapted to be coupled to a phase of the input AC power and a second end coupled to the inverter; and
   an electromagnetic compatible filter having a resistor-capacitor circuit between at least one of the second ends of the input filter winding and a ground point, wherein the electromagnetic compatible filter is not required to carry all of the current of the variable speed drive system and wherein the electromagnetic compatible filter is configured to substantially reduce the gain of noise over a frequency range at which the converter generates noise by parallel resonance thereby preventing the noise from the parallel resonance from passing through the input filter to a source of the input AC power.

2. The variable speed drive system of claim 1, the electromagnetic compatible filter further comprising first filter ends connected to respective second ends of the input filter winding, and a second filter end connected to a common ground point.

3. The variable speed drive system of claim 2, the electromagnetic compatible filter further comprising a resistor-capacitor filter bank, the first filter ends connected to the respective second ends of the input filter winding forming a WYE configuration.

4. The variable speed drive system of claim 1, further comprising the common ground point being a ground point on the converter.

5. The variable speed drive system of claim 1, further comprising a converter having a passive front end.

6. The variable speed drive system of claim 1, further comprising each winding of the three-phase inductor having a center tap dividing each winding into a pair of inductor sections.

7. The variable speed drive system of claim 6, further comprising a converter having an active front end.

8. A method of operating a variable speed drive system, the method comprising:
   receiving input AC power at a fixed AC input voltage magnitude and frequency;
   converting the input AC voltage to a DC voltage in a converter;
   filtering the DC voltage and storing energy from the converter in a DC link;
   inverting the DC voltage from the DC link into AC power;
   providing an output AC power at a variable voltage and a variable frequency; and
   attenuating the gain of noise caused by parallel resonance in the converter thereby preventing the noise from passing through the input filter to a source of the input AC power.

9. The method of claim 8, wherein the step of attenuating the gain of noise caused by parallel resonance in the converter is achieved by an electromagnetic compatible filter.

10. An electromagnetic compatible filter for use with a variable speed drive, the variable speed drive comprising an input adapted to be coupled to an input AC Power source, an input filter coupled between the input and a converter, the electromagnetic compatible filter coupled at a first end to the juncture of the input filter and the converter, and at a second end to a ground, the electromagnetic compatible filter capable of attenuating the gain of noise caused by parallel resonance in the converter thereby preventing the noise from passing through the input filter to the AC power source.

11. The electromagnetic compatible filter of claim 10, further comprising the ground to which the second end is coupled is a ground point on the converter.

* * * * *